US008495974B2

(12) United States Patent
Agosta

(10) Patent No.: US 8,495,974 B2
(45) Date of Patent: Jul. 30, 2013

(54) FUEL SYSTEM AND METHOD FOR BURNING LIQUID AMMONIA IN ENGINES AND BOILERS

(76) Inventor: Vito Agosta, Huntington, NY (US)

( * ) Notice: Subject to any disclaimer, the term of this patent is extended or adjusted under 35 U.S.C. 154(b) by 1108 days.

(21) Appl. No.: 12/454,443

(22) Filed: May 18, 2009

(65) Prior Publication Data

US 2010/0288211 A1    Nov. 18, 2010

(51) Int. Cl.
 *F02B 43/00*    (2006.01)
(52) U.S. Cl.
 USPC .............................................. 123/1 A; 123/2
(58) Field of Classification Search
 USPC .................................................. 123/1 A, 2, 3
 See application file for complete search history.

(56) References Cited

U.S. PATENT DOCUMENTS

| | | |
|---|---|---|
| 3,900,554 A | 8/1975 | Lyon |
| 3,937,445 A | 2/1976 | Agosta |
| 4,166,724 A | 9/1979 | Kanao |
| 4,468,127 A | 8/1984 | Agosta |
| 5,224,346 A | 7/1993 | Berriman et al. |
| 5,609,026 A | 3/1997 | Berriman et al. |
| 6,613,904 B2 | 9/2003 | Montanari |
| 6,701,953 B2 | 3/2004 | Agosta |
| 7,188,469 B2 | 3/2007 | Bonadies et al. |
| 7,574,993 B2 | 8/2009 | Gillespie et al. |
| 2003/0084658 A1 | 5/2003 | Brown et al. |
| 2006/0010857 A1 | 1/2006 | Hu et al. |
| 2007/0012032 A1 | 1/2007 | Hu |
| 2008/0302093 A1 | 12/2008 | Montgomery et al. |
| 2011/0114069 A1 | 5/2011 | Grannell et al. |
| 2012/0148925 A1 | 6/2012 | Grannell et al. |

OTHER PUBLICATIONS

Gillespie et al., Welcome to NH3 Car, www.nh3car.com, 4 pgs., printed Aug. 6, 2012.
Hofstrand, "Ammonia as a Transportation Fuel", AgMRC Renewable Energy Newsletter, May 2009, www.agmrc.org/renewable_energy/ . . . .
Reiter et al., "Demonstrate Ammonia Combustion in Diesel Engines", Dept. of Mech Eng, Iowa State Univ., 4th Annual Conference on Ammonia, Oct. 15-16, 2007.
"Historical Uses of Anhydrous Ammonia as a Fuel", Doc ID No. {00256162v1}.
Thomas et al., "Potential Roles of Ammonia in a Hydrogen Economy", US Dept. of Energy, pp. 1-23, Feb. 2006.

(Continued)

*Primary Examiner* — Noah Kamen

(57) ABSTRACT

A process and apparatus is provided for burning liquid ammonia in an energy device such as a diesel engine, boiler or gas turbine. In particular, the process and apparatus include mixing a renewable fuel with a low flame speed and high ignition temperature, e.g., ammonia, with a combustible liquid fossil or bio-fuel and supplying the mixture into a closed fuel loop where part is efficiently burned in an engine combustion chamber, and part is used to cool the engine and returned by the loop for mixture with fresh incoming fuel mixture. The invention provides for the mixing and emulsifying in such a way that vapor lock is avoided. In the loop, the mixture is emulsified into a disperse distribution of fuel droplets such that upon injection of a portion into the combustion chamber, the renewable fuel in an emulsified droplet evaporates, mixes with the air and forms a small combustion cell surrounding the liquid fuel droplet. The fuel droplet burns and then serves as an ignition kernel for the gas mixture in the small combustion cell producing efficient and rapid combustion of the renewable fuel. The fuel loop allows the fuel system to automatically scale for engines varying in power output from 1 to 35,000 horsepower.

26 Claims, 4 Drawing Sheets

OTHER PUBLICATIONS

Upshaw, Energy, Technology, & Policy, "Is Ammonia the transportation fuel of the future?", http://webberenergyblog.wordpress.com/2010/02/21/. . . Feb. 2010 (Printed Jan. 26, 2012).

Knight, "Portable ammonia factories could fueld clean cars", Magazine issue 2828, www.newscientist.com/article/mg21128285.100 . . . , Sep. 2011 (printed Jan. 26, 2012).

Nett, "Ammonia-fuel venture seeks investors", LubbockOnline, http://lubbockonline.com/business/2011-07-16/ . . . , Jul. 2011 (printed Jan. 26, 2012).

"Breaking open boranes to power fuel cells", RSC Advancing the Chemical Sciences, Chemistry World, www.rsc.org/chemistryworld/News/2011 . . . , Aug. 2011 (printed Jan. 26, 2012).

McClintock et al., "Alternative Fuels: Taking a Second Look at Ammonia", Ntnl. Def. NDIA's Bus. and Tech. Mag., www.nationaldefensemagazine.org/ARCHIVE/2008/AUGUST/Pages/ . . . .

Holbrook, "Renewable Fuels: Ammonia Made from Hydro: Renewable Fuel of the Future?", HydroWorld.com, www.hydroworld.com/index/article-tools-template/. . . (printed Jan. 26, 2012).

"Hydrofuel and lcom to announce world's first aftermarket system to enable cars . . . ", Hydrofuel Inc., http://s180382863.onlinehomeus/ . . . , Oct. 2007 (printed Jan. 26, 2012).

Kordesch et al., "Ammonia as Hydrogen Source for an Alkaline Duel Cell-Battery Hybrid System", Technical Univ., Graz, Austria.

Topre, "Is Ammonia a Better Fuel?", www.crazyengineers.com/is-ammonia-a-better-fuel/, Mar. 2011 (printed Jan. 26, 2012).

"Ammonia Cracker for Fueld Cell Hydrogen Supply", Pure Energy Systems News, http://pesn.com/2005/05/24/6900101_ZAP_ammonia_cracker/, (printed Jan. 26, 2012).

Botte, "Ammonia Electrolysis and Fuel Cell Research", CE3, Consortium for Energy, Economics and the Environment, http://ce3.ohio.edu/botte.aspx, Apr. 2008 (printed Jan. 26, 2012).

Jacobson et al., "Support for R&D to Further Develop Ammonia as a Fuel and Fuel Component". . . .

FUEL SYSTEM AND METHOD FOR BURNING LIQUID AMMONIA IN ENGINES AND BOILERS

BACKGROUND OF THE INVENTION

The present invention broadly relates to fuel systems and, more particularly relates to a fuel system and method of forming and dispersing liquid ammonia/fuel oil emulsified droplets within a combustion volume of a conventional diesel engine, e.g., 5 hp to 35,000 hp, boiler or gas turbine to produce efficient and rapid combustion of the ammonia/fuel oil mixture comprising the fuel emulsion.

At present, internal combustion engines, boilers and gas turbines, which power our cars, planes, trains and ships, and generate steam and electricity at institutional, commercial facilities and utilities, rely substantially on fossil fuels. The global supply of fossil fuels is known to be finite and experts predict that they will run dry at some time about the end of this century. It is obviously crucial to develop renewable energy sources to fuel the internal combustion engines, boilers and gas turbines to power our transportation and also the commercial and industrial facilities and utilities.

While alternate forms of energy exist that can be adapted to supply short term needs, some of these are not environmentally friendly and their long term use may have an effect of poisoning our planet. Moreover, because our planet is comprised of air, water and earth, any fuels derived there from to replace non-renewable fossil fuels should be returnable to, or near their physical and chemical state after combustion. If we start with air and water to manufacture a renewable fuel, then the above objective can be achieved. The family of possible fuels that can be derived or formed directly from air and water are those containing hydrogen, nitrogen and oxygen. It is recognized that hydrogen, ($H_2$), is an excellent fuel, but it is known to be volatile and dangerous, and if mishandled, its use as a common fuel would put the average layperson in harm's way. In addition, as yet the technology for storing, handling and distributing hydrogen is not fully developed.

It has nevertheless been proposed to set up a hydrogen economy where hydrogen fuel cells would be substituted in the place of engines, to supply power for transportation, commercial and industrial facilities and utilities. While this may be a long term objective, in all likelihood, for example, it would take about twenty years to develop a viable hydrogen-fueled propulsion system and another twenty years to substitute/introduce it to replace existing fossil fuel driven engines. The projected costs for such a program are estimated to be very high, which would stress both government and corporate finances.

At this time ammonia, ($NH_3$), is an efficient hydrogen carrier, capable of implementation to render available hydrogen as a common fuel or fuel supplement. Ammonia is readily available as an infinite renewable energy source, and can be introduced within a few years as a secondary fuel source for existing combustion engines, thus eliminating both time delay and excessive costs associated with hydrogen. Technology for the utilization of gaseous ammonia as a fuel or fuel component in energy devices is already in progress, but combustion technology is not as yet available for the combustion of ammonia in high speed engines. That is, because of its high ignition temperature and slow flame speed, ammonia is a poor fuel for use in high-speed internal combustion engines. However, it is proposed to overcome these difficulties for internal combustion engines by using liquid ammonia emulsified into a non-miscible liquid with low ignition temperature. These latter fuel components can be identified as fossil or bio-fuels.

SUMMARY OF THE INVENTION

The present invention provides a means for overcoming the present shortcomings of the combustion of ammonia.

It is an object of this invention to provide a novel ammonia-based fuel preparation process that can be applied to conventional combustion devices.

It is a further object of this invention to provide a means of preventing cavitation that can otherwise occur in fuel system components.

It is another object of this invention to provide a novel ammonia-based fuel preparation process and system that can be incorporated into conventional combustion devices with a minimum down time and expense.

It is another object of this invention to provide a novel ammonia-based fuel preparation and system that overcomes combustion problems of fuels such as ammonia that display such characteristics as high ignition temperatures and low flame speeds.

It is another object of this invention to provide a fuel system and method that produces an ammonia/diesel fuel oil gaseous cellular structure after injection into the combustion volume of the energy device and said fuel cellular structure functions as a combustible unit.

It is a further object of this invention to provide a fuel system and method that produces a diverse dispersion of ignition kernels in an ammonia/diesel oil fuel distribution within a combustion volume of the energy device.

It is a further object of this invention to provide a fuel system and method that produces small gaseous cell sizes such that, upon ignition of the diesel oil, the flame within the cell travels a small distance in a short interval of time thus obtaining complete chemical reaction quickly throughout the cell combustion volume.

It is still another objective of this invention to provide an ammonia/diesel oil fuel system that operates a fuel mixing and delivering control system that is scalable for variable sized engines and boilers.

In one embodiment, the invention provides a fuel system and method for forming and delivering an ammonia/diesel oil emulsion to a conventional combustion chamber such that the ammonia is easily ignited and the ensuing flame need only travel a short distance by confining an ignition kernel within a small combustion cell.

A method of preparing a mixture of ammonia and fuel oil for use in an internal combustion engine comprising first providing a supply of ammonia, liquid or vapor, at a predetermined pressure, temperature and flow rate to a metering-mixing module, second providing a supply of fuel oil at a predetermined pressure, temperature and flow rate to the metering-mixing module, mixing a predetermined ratio of the supplies of fuel oil the ammonia, liquid or vapor, in the metering-mixing module and supplying the predetermined ratio of these fuels at a specified temperature and pressure into a fuel control loop for use by the internal combustion engine.

The step of supplying includes a) using a jet pump, first channelling the predetermined ratio into an emulsifier subsystem to generate an emulsified fuel mixture flow, b) injecting a portion of the emulsified fuel mixture flow into a combustion chamber of the internal combustion engine to generate a disperse distribution of liquid fuel droplets therein to facilitate the formation of small combustion cells and thus produce efficient burning of both the ammonia and fuel oil components to provide a desired power; c) where necessary a second channelling of the remaining portion of the emulsified fuel mixture flow through the combustion engine head to cool the engine and d) recirculating the remaining portion exiting the combustion engine head to the jet pump while regulating its temperature and pressure and combining it with the incoming predetermined ratio from the mixing-metering module in the step of first channelling.

The method can include a step of implementing a heat exchange process on the predetermined ratio prior to first channelling in the fuel control loop. The step of first providing the supply of ammonia at the predetermined temperature can include applying temperature control using at least one heat exchanger and wherein the step of second providing the supply of fuel oil at the predetermined temperature includes applying temperature control using at least one heat exchanger. The components of the fuel droplets in the disperse distribution generated in the step b) of injecting the portion of the emulsified fuel mixture flow are characterized by different evaporative characteristics. The different evaporative characteristics cause the fuel droplet components to evaporate and shatter, thereby facilitating efficient combusting the ammonia component. The step can include that one component is in a liquid state comprising a liquid kernel, i.e., core, and the other component is in a gaseous state surrounding the liquid kernel to form a cell. In this manner, the cell's liquid core functions as an ignition kernel to the cell's gaseous volume surrounding the liquid core.

The method may include that the sub-steps of a) channelling and recirculating the predetermined ratio and remaining portion exiting the combustion engine head, respectively, allows for scaling the predetermined ratio for a large range of internal combustion engine sizes, wherein the large range comprises combustion engines in sizes extending from 5 hp to 3500 hp. The present combustion engine is a 400 HP Waukesha diesel engine. For this engine, the step d) of recirculating the remaining portion exiting the combustion engine head and combining it with the first channelled predetermined ration includes facilitates mixing fluid components characterized by different pressures to insure smooth interacting flows that avoid or prevent slug flow. For that matter, a step of selecting of the liquid region of thermodynamic pressure-temperature space so that the temperate and pressure are maintained in cooperating ranges in order that the liquid ammonia component is not susceptible to vapor lock or cavitation.

In the method, the fuel droplet components with the different evaporative characteristics are formed with a liquid particle at injection into the combustion chamber of one of: a diesel engine, a gas turbine and a boiler. Alternatively, the fuel droplet components with the different evaporative characteristics are formed with a solid particle at injection into the combustion chamber of one of: a diesel engine, a gas turbine and a boiler. The step b) injecting the portion of the emulsified fuel mixture flow includes fuel droplet components characterized with different ignition characteristics, and wherein one of the fuel droplet components ignites the remaining fuel droplet components in the combustion chamber. The step of mixing may include the use of fuel additives in order to enhance the ignition and combustion characteristics of the fuel mixture. The fuel additives reduce the cycle pressure deviation thus producing smoother running engines and thus decrease engine hunting.

The step of providing a supply of ammonia includes sensing a pressure of ammonia as it is pumped to the metering-mixing module, and based on the sensing, regulating the pumping to avoid vapour lock and cavitation. The step of first channelling includes sensing a pressure of the predetermined ratio as it is pumped to the metering-mixing module, and based on the sensing, regulating the pumping to avoid vapour lock and cavitation. The regulating includes utilizing a look-up table comprising saturation pressure verses temperature for the ammonia and fuel oil components, and controlling the respective temperatures and pressures based thereon. Preferably, the step of providing further includes using an ammonia pump motor that generates pumping power as a function of motor RPM, and controlling motor RPM as a function of a pressure difference between the local pressure and a vapour pressure of ammonia being pumped, where the steps of first channelling and second channelling includes cooling the predetermined ratio and remaining portions respectively in a bypass controllable as function of detected pressure and temperature The invention also includes a fuel system for mixing a renewable fuel that is normally slow burning with a fuel oil, emulsifying the mixture and supplying the emulsified mixture to a combustion engine while avoiding vapour lock and cavitation. The system comprises an ammonia supply system for holding ammonia at its vapour pressure in order to supply the ammonia in its liquid state, the ammonia system comprising a fluid conduit connected to a heat exchanger and pump, a fuel oil supply system comprising a fuel oil reservoir, a fuel oil pump and a fuel oil pressure control device, a metering-mixing system in fluid communication with the ammonia and fuel oil supply systems, to mix the ammonia and fuel oil in a predetermined ratio, the metering mixing system comprising a heat exchange means and pressure control means to maintain the predetermined ratio at a temperature and pressure that avoids cavitation and vapour lock and a fuel emulsifier loop comprising a jet pump, a fuel mixture pump, a heat exchanger and a fuel emulsifier interconnected to enable a flow to a combustion engine, wherein the jet pump channels the predetermined ratio into the fuel mixture pump and emulsifier sub-system to generate an emulsified fuel mixture flow, and one portion of the emulsified fuel mixture flow is injected into a combustion chamber as a disperse distribution of liquid fuel droplets, a remaining portion of the emulsified fuel mixture flow through the combustion engine head to cool the engine and a remaining portion exiting the combustion engine head is recirculated to the jet pump and combined with the incoming predetermined ratio from the mixing-metering module.

The fuel system preferably further comprises a heat exchanger to prevent cavitation in the fuel control loop, and a pressure and temperature detection and control means. The heat exchangers are connected to a refrigeration system. The fuel control loop includes a heat exchanger forming a bypass together with a three way solenoid valve to open and shut off the flow of ammonia and refrigerant in that bypass section. The fuel control loop further includes a pressure sensor and motive devices to control a local pressure based on detected ammonia saturation pressure determined as a function of temperature. A pressure sensor disposed at the entrance of the ammonia pump detects if pressure falls below the saturation pressure of the ammonia, and responds by slowing a motor driving the pump, while operating the heat exchanger to lower the ammonia temperature. For that matter, the invention includes a combustion engine comprising such a fuel system, and a combustion engine in which a fuel system with which the motor vehicle is initially constructed is replaced with such a fuel system.

The invention includes a method of obtaining rapid combustion of a mixture comprising a fuel characterized by a low ignition temperature and high flame speed, and a volatile fuel comprising a high ignition temperature and low flame speed. The method comprises acts of producing a liquid fuel emulsion comprising the volatile and non-volatile fuels; compressing air in a compression stroke of an engine in order that the air temperature is greater than the ignition temperature of a component of the fuel emulsion, injecting the liquid fuel emulsion into the combustion volume in the form of a disperse distribution of droplets, wherein back heat transfer from the compressed air heats the fuel emulsion droplets thereby shattering the droplets and causing a component of the fuel to ignite and burn and thereby igniting the remaining volatile fuel-air mixture.

The method includes a step of maintaining the volatile fuel at a pressure and temperature at which it is always in a liquid state until the droplets shatter. Preferably, the step of injecting produces a droplet size that is sufficiently small in order that the non-volatile gas flame progresses through the droplet gaseous cell in a time short enough to completely combust. The method may include a step of adding fuel additives to enhance the ignition and combustion characteristics of the fuel mixture, wherein the step of adding fuel additives reduces a cycle pressure deviation to minimize engine hunting.

BRIEF DESCRIPTION OF THE DRAWING FIGURES

Aspects of the invention will become apparent upon reading the following detailed description and upon reference to the accompanying drawings in which, like references, may indicate similar elements:

Figure 2:
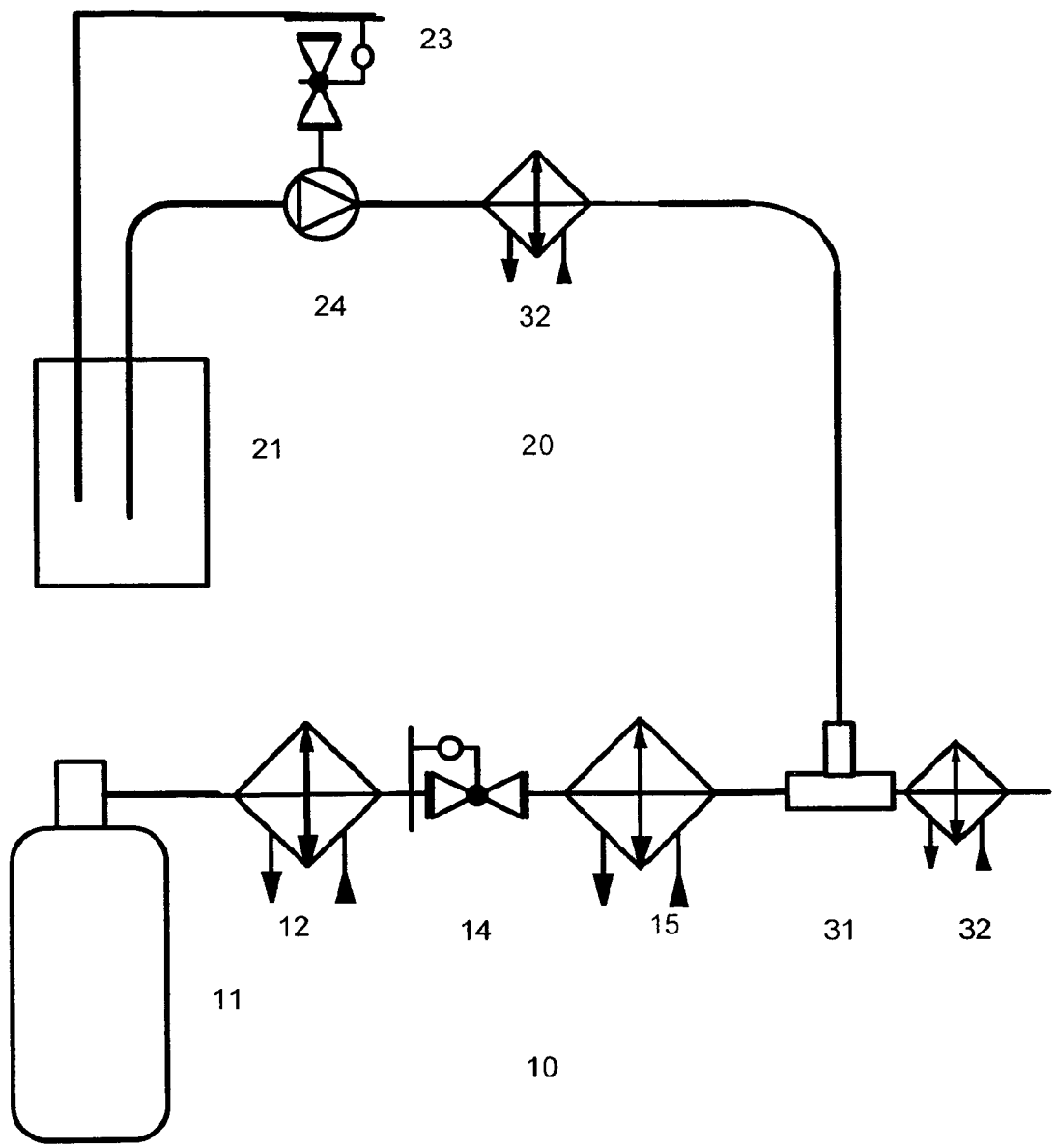
FIG. 2 is a system level diagram embodiment that can be substituted within the liquid ammonia fuel system depicted in FIG. 1.

FIG. 3B a plot is shown of the thermodynamic process on the pressure-temperature plane, (C-C), occurring in a pressure regulating valve for a volatile substance corresponding to FIG. 2.

FIG. 3C a plot is shown of the thermodynamic process on the pressure-temperature plane, (C-C), occurring at the pump entrance for a volatile substance.

Figure 4:
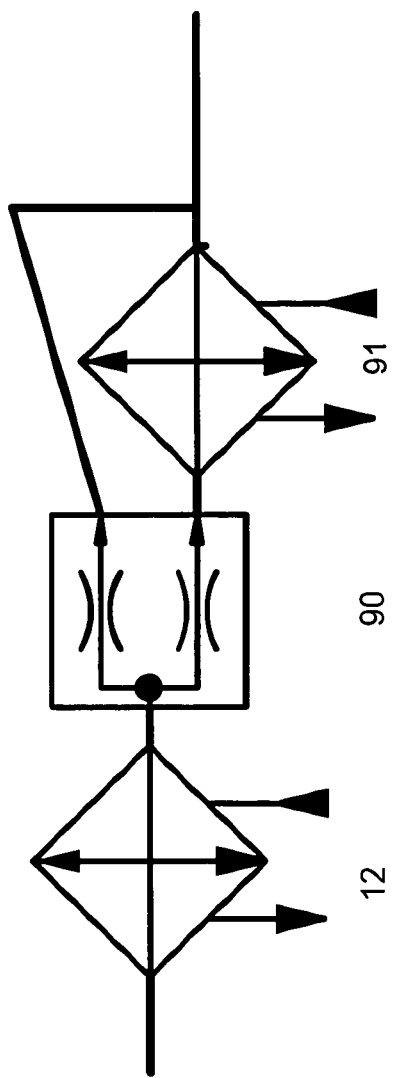

FIG. 4 is a system level diagram depicting a 3-part solenoid valve which can be utilized by the inventive system and method.

DETAILED DESCRIPTION OF THE INVENTION

The following is a detailed description of example embodiments of the invention depicted in the accompanying drawings. The invention may take the various forms of a fuel system, a method, an energy generating device deploying the system and/or methods, which produce and deliver an ammonia/fuel oil emulsion to a conventional combustion chamber such that the ammonia is easily ignited and the ensuing flame need only travel a short distance by confining the ignition kernel within the cell.

The example embodiments are described in such detail as to clearly communicate the invention. However, the amount of detail offered is not intended to limit the anticipated variations of embodiments; on the contrary, the intention is to cover all modifications, equivalents, and alternatives falling within the spirit and scope of the present invention, as defined by the appended claims. The descriptions below are designed to make such embodiments obvious to a person of ordinary skill in the art.

For example, while the particular examples used and described herein are directed to the use of ammonia ($NH_3$) as an exemplary sustainable fuel for mixture (emulsification) with fuel oil, the invention is not limited to use with ammonia.

As known to those skilled in the art, ammonia ($NH_3$) displays a high ignition temperature and low flame speed, which as such it is not compatible with modern high-speed combustion engines. The combustion model, fuel system and method described with the use of ammonia should be understood to be adaptable for beneficial application with any renewable hydrogen-based fuel normally displaying low flame speed and high ignition temperature, not just ammonia.

For that matter, the hydrogen-based fuel is meant to be emulsified with a renewable fuel oil. While the examples used and described herein are directed to diesel oil specifically, which is non-renewable fossil fuel oil, it should be understood that the description's diesel fuel oil-based description is made for simplicity of explanation only. The invention is not meant to be limited to use with diesel oil or other fossil-based fuel oils, but will be most valuable in an environmental sense when used with fuel oils derived from plants and naturally occurring substances.

In a Venturi cavitation device a sequence of phases occurs for one or more of the components of the fuel mixture, namely the phases change from liquid to vapor to liquid. In diesel engines the liquid fuel usually circulates through cooling passages in the cylinder head thus heating the fuel and possibly vaporizing part of it. A particular problem occurs when one or more of the liquids are highly volatile in that vapor lock occurs in the fuel lines or devices and renders them inoperable. We encounter a dichotomy; namely, we purposefully produce a vapor/gas in a local part of the fuel emulsifier system, whether it is in the cavitating Venturi or the heated fuel lines. However, ultimately we require that the fuel be in the liquid state for injection into the diesel engine cylinder.

In the course of designing fuel systems for burners and engines, a particular design was generated which has great merit. The very essence of the design of the fuel system includes of a fluid loop with an inlet to the loop and an exit from the loop to the engine or burner. Although the design has been applied to both engines and burners, I shall restrict this discussion and application to engines. The fuel loop offers many advantages.

The fuel loop allows for fuel storage which circulates in the loop. The range of engine sizes that can operate from a single loop is dependent on the amount of fuel withdrawn from the loop. Theoretically from a large loop the engine sizes can range from 1 hp to 50,000 hp. This is feasible but not practical. For example, the fuel emulsifier unit designed for the 400 hp Waukesha diesel engine can run engines from about 5 hp to 700 hp; and this is accomplished automatically without any modification to the fuel system or engine.

The fuel loop contains the emulsifier, and this is placed adjacent to the inlet of the diesel fuel manifold. The real time interval between the fuel emulsion formation and fuel injection is short preventing fuel 'creaming', i.e., separation.

In many diesel engines the fuel is used to cool parts of the engine. If the fuel contains volatile components, then vapor lock can occur. It is most probable that the fuel returning from the engine fuel manifold also contains vapors causing vapor lock. Two solutions become apparent to this problem. The first solution is to increase the local fluid pressure in the loop segment up to its maximum value. This procedure alone may not be sufficient to prevent vapor lock. The second solution is to cool the fuel in that portion of the loop. The parametric combination of these two solutions can be observed by plotting the thermodynamic states in the vicinity of the Clausius-Clapeyron locus in thermodynamic pressure-temperature space. The occurrence of vapor states then becomes obvious and can be prevented.

In our case liquid ammonia is the secondary component of the fuel mixture that is emulsified into the fossil fuel. The vapor pressure of ammonia varies widely with temperature. Of interest is the effect of local ambient temperature on the ammonia vapor pressure. Military and commercial specifications may vary from −50° F. to 110° F.; and the concomitant vapor pressures vary from 7.7 psia to 248 psia. The fuel loop described herein will operate at these extreme temperatures without modification.

The emulsified fuel is immediately led into the diesel engine. A portion of the fuel is used by the engine to generate power. The excess fuel emulsion is used by this engine to cool the diesel head, thus we additionally use a cooler to prevent vapor lock in the lines. It is recognized that vapor lock can also be prevented by increasing the line pressure. The pressure in the line is maintained by a back pressure regulator valve.

Care must be taken for the selection of the liquid region of thermodynamic space to develop processes for the liquid ammonia such that vapor lock is prevented in the ammonia fuel pump and other components of the fuel system. If the pressure of the liquid ammonia is at its boiling point, then at the entrance to the ammonia pump, due to the negative suction head, cavitation will occur. The fuel system component designs that accrue from the aforesaid criteria will suggest the following designs.

Figure 1:
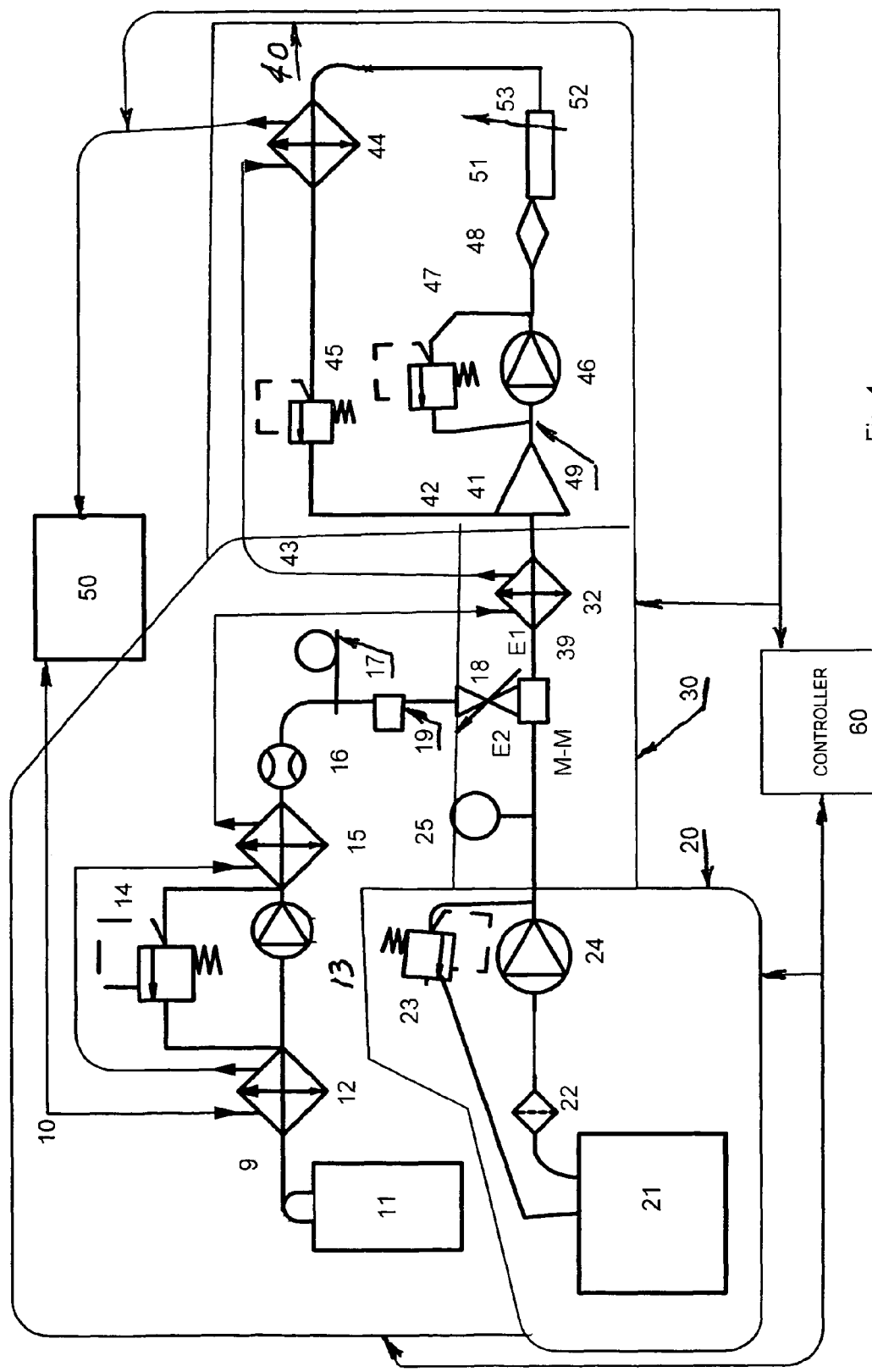
FIG. 1 is system level diagram depicting one embodiment of liquid ammonia fuel system of the invention.

Turning now to FIG. 1, a fuel system (1) for mixing a renewable fuel (e.g., ammonia) with a fuel oil (e.g., diesel), and emulsifying and supplying the mixture to a engine combustion chamber (e.g., a diesel engine), constructed in accordance with the inventive principles in order to avoid vapour lock and cavitation while effectively burning the emulsion will now be described. While the FIG. 1 system is intended for use with a diesel engine, and is scalable for use with diesel engines with varied power generating capacity, e.g., automobiles, trucks, ships, physical plants, etc., the fuel system is not limited to diesel engines. The FIG. 1 system (1) as shown comprises five sub-systems or functional parts, namely: an ammonia supply system (10); a fuel oil supply system (20), a metering module or system (30), a fuel emulsifier loop (40) and a refrigeration sub-system (50).

Ammonia supply system (10) includes ammonia reservoir (11), which holds ammonia at its vapour pressure in order that it is maintained in its liquid state. The ammonia is caused to flow in a fluid flow path from the ammonia reservoir (11) within a fluid conduit (9) to a heat exchanger (12) in order to cools the ammonia. The flow is controlled by an ammonia pump (13) in cooperation with a back pressure regulator valve (14; BPRV). The ammonia is pumped through a second heat exchanger (15), through ammonia flow meter (16) to a metering-mixing module (31), which is part of mixing-metering module system, (30). Pressure gage (17) and shut off valve (18) are included for obvious reasons, and back flow preventer (19) prevent any backflow of the liquid ammonia.

During the fuel system operation, the ammonia pump (13) enables the flow from the ammonia reservoir (11) in a liquid saturation state. The liquid ammonia is sub-cooled by the heat exchanger (12). Heat exchanger (12) is attached to a refrigerator (50), as shown. The pressure of the liquid ammonia is increased by pump (13), and limited by the BPRV (14). The liquid ammonia is again cooled by heat exchanger (15). The available ammonia is at the liquid state as it enters the fuel line or conduit (9) of FIG. 1. As the liquid ammonia reaches pump (13), normally a negative suction pressure develops producing cavitation, which without compensation is likely to cause the liquid to boil and damage or destroy the pump.

The liquid ammonia flow rate is measured by the flow meter (16). Back flow preventer (19) maintains the flow lines and pump free from contamination. The pressure of the "in-line" liquid ammonia is detected and communicated to an observer via pressure gage (17). The shut-off valve, which may be either mechanically or solenoid operated, controls stop/start the liquid ammonia flow to a first entry port E1 of the metering-mixing unit (31) in the metering system or module (30).

Before discussing the mixing-metering module or system (30), fuel oil supply system (20) will be described in detail. That is, fuel oil supply system (20) comprises a standard fuel oil reservoir (21), for holding and supplying fossil or non-fossil derived fuel oil. A conduit (19) in communication with the fuel oil within the fuel oil reservoir (21) provides for a fuel oil flow through a filter (22) to a pump (24), the flow controlled by a BPRV (23). A pressure gage (25) and a back flow preventer (26) are included to monitor and maintain the fuel-oil flow into a second entry port E2 of the metering-mixing unit (31).

The metering-mixing unit (31) is part of a metering-mixing system (30), which receives liquid ammonia in first entry port E1 from ammonia supply system (10), and fuel oil in second entry port E2 from fuel oil supply system (20). The metering-mixing unit (31) meters and mixes the ammonia and fuel oil, passing it along conduit (39) though a heat exchangers (32 and (33), and into fuel emulsifier loop (40). Operation of the metering-mixing module is described in U.S. Pat. No. 4,468,127 to Vito Agosta, incorporated in whole by reference herein. The aforesaid U.S. Pat. No. 4,468,127, teaches how to design the module such that it varies the fluid mixture ratio as a function of fluid volume flowing through the module; i.e., to vary the mixture ratio as a function of engine or boiler load so that the combustion characteristics of the fuel mixture can match those of the engine or boiler. The above said behaviour occurs automatically and is dependent on the thermo-fluid dynamics occurring in the device. The heat exchanger (32) is used to cool the fuel mixture.

FIG. 2 depicts an alternative embodiment of the ammonia supply system (10), operating in cooperation with fuel oil supply system (20). That is, FIG. 2 depicts an ammonia supply system (10') and fuel oil system (20). No ammonia fuel pump is employed in the FIG. 2 ammonia supply system (10'). As such, fuel oil is injected into the ammonia stream within metering-mixing unit (31).

Operation of fuel emulsifier loop or system (40) is instrumental to the novel and non-obvious operation of the ammonia fuel system (1), the method and power consuming devices that operate in accordance with the inventive principles. Fuel emulsifier system (40) comprises a jet pump (41), a fuel mixture pump (46), a BPRV (45), a pressure gage (47), a fuel emulsifier (48), all connected by a conduit (49) as a fluid flow path to an entry port (51) of a engine manifold (52), e.g., diesel, of a conventional engine system. Excess fuel from the fuel manifold (52) is carried out of exit port (53) via a conduit (49) back to the jet pump (41) through heat exchanger (44), the back pressure regulated by BPRV (43), and is monitored via pressure gage (42). Engine manifold (52) comprises fuel injectors and diesel head cooling passages, as known to those skilled in the art.

The inventive system and method are unique in their ability to provide a for effectively mixing ammonia and fuel oil in order that it flow and burn in a conventional combusting chamber efficiently, and in a way that scales readily for implementing relatively minimal fuel flow needs, e.g., for a van or passenger vehicle, to relatively large fuel flow needs, e.g., for a large fuel-oil powered electrical generating plant or system.

A significant feature inherent in the system's construction for configuration and cooperation with an engine manifold, in its operating state, allowing the capture and re-circulating of the fuel emulsion in controlled fluid-flow loop that serves as well as a variable fuel emulsion storage means; this variable storage means, i.e., fuel loop, is not attained by varying the volume of the flow lines in the system but by varying the fuel flow flux in the lines.

Operation of the fuel emulsifier loop or system (40) begins as the mixed fuel oil and ammonia entry into jet pump (41). The jet pump (41) essentially merges the fresh fuel charge with the re-circulated fuel smoothly together without generating undesirable non-homogeneities such as slug flow; and when properly designed, combines streams of different pressures. The fuel mixture pump (46) together with the BPRV (45) prepares the fuel mixture for the operation of the fuel emulsifier (48). The operation of the fuel emulsifier is covered by U.S. Pat. No. 3,937,445 to Vito Agosta, incorporated in whole by reference herein. The diesel engine fuel manifold is not part of the inventive fuel system as such, and it is shown to complete the flow passage circuit of the fuel. In this case, as occurs with the Waukesha diesel engine, there is an excess of fuel which is employed to cool the diesel engine head and circulates through fuel conduit (49).

The heat exchanger (44) follows to prevent cavitation of the fuel stream due to the heat picked up in the diesel head. The BPRV (43) maintains a pressure in line (49). It is recognized that both pressure and temperature are parameters that can be modified to prevent vaporization of any of the components of the fuel mixture or emulsion, i.e., cavitation. Thus for the case where excess fuel, i.e., a fuel return exists, and where it is used to cool parts of the diesel engine, both pressure and temperature are varied in order to prevent cavitation. This control is accomplished directly in cooperation with the heat exchanger (44) and the BPRV (43), and indirectly by the fuel pump sub-system comprising pump (45) and valve (46). The fuel conduit, (49), is made as short as possible, and cavitation is prevented there and through the jet pump and line (49) by determining both pressure and temperature history in lines (39) and (49), and fuel outlet temperature from heater exchanger (32).

The refrigeration system (50) is employed to cool the fuel system (1) so that cavitation is prevented. Together with the fuel pumps, refrigeration system (50) maintains the ammonia in the liquid state, both in and out of emulsion. That is, emulsifier (48; FIG. 1) operates based on the principle of evaporation at the "throat" of its Venturi design and subsequent cavitation in the outlet diffuser. If the pressure is not recovered sufficiently downstream of the throat, then vapor lock will persist in the fuel lines causing the diesel engine to "hunt.", i.e., variation in engine speed. For proper operation, this unwanted vaporization must be overcome, and it is overcome by proper Venturi design and operating conditions.

To eliminate the problem, it must be first understood. To do so, the Clausius-Clapeyron locus for any volatile component of the fuel mixture must be determined or calculated, and plotted in thermodynamic pressure-temperature space. In this case, the first task in solving the problem of cavitation and vapor lock is to determine the Clausius-Clapeyron locus for ammonia. The data can be deduced from enthalpy-entropy charts and plotted on the pressure-temperature plane. The temperature is the abscissa and the pressure is the ordinate, as shown in FIGS. 3A, 3B and 3C.

Where data does not exist for this locus, it can be obtained in several ways. One way includes obtaining the critical point and the triple point or the normal boiling point, and then using the thermodynamic law of corresponding states to develop the curve. Once the locus is developed, it is seen that an increase in pressure is represented by a vertical line, and a change in temperature is represented by a horizontal line (see FIG. 3A). While the real world is not ideal, the slope of these lines can be obtained by modifying the pressure or temperature as a function of pump efficiency and heat transfer effectiveness, using normal thermo-fluid dynamic procedures.

As an example, referring to FIG. 1, if the heat exchanger, 12, were not placed before the pump, 13, the incoming ammonia, being at its saturation state and subject to the negative suction head would follow a decrease in pressure causing it to vaporize, destroying the pump. By placing a heat exchanger before the pump, the ammonia is cooled, driving the process to the left into the liquid region (see FIG. 3C). The vertical distance between the end of that process and the C-C locus must be numerically greater than the suction head at the entrance to the pump (13).

The analysis of the emulsifier is more complicated in that the fluid dynamics must be combined with thermodynamics. Suffice it to say that the evaporation produced at the throat of the cavitating Venturi (at emulsifier (48)), must be suppressed by increasing the fuel mixture pressure in the Venturi exit. The increased pressure is maintained by the BPRV (43) in the fuel emulsion loop. But the invention does not rely on high pressure alone in order to prevent the unwanted evaporation, but controls the pressure in combination with a cooling process concurrently and in cooperation with the pressure recovery process in the emulsifier (48) Venturi.

Figure 3:
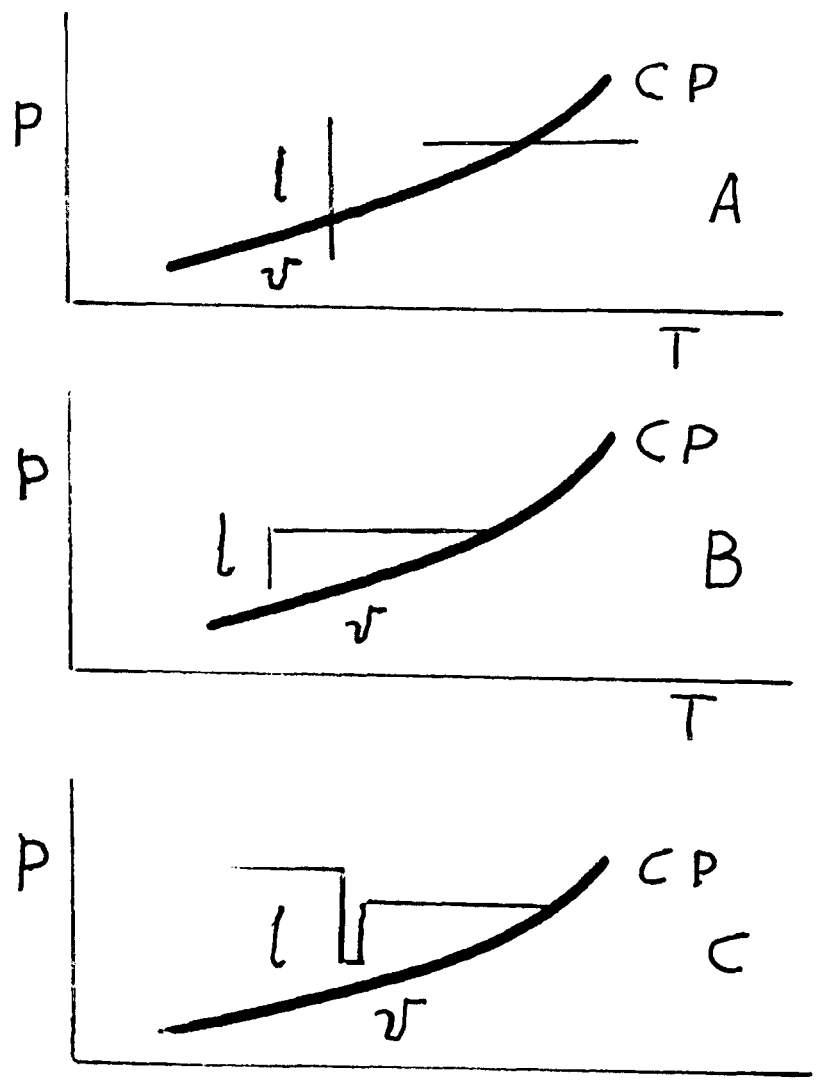
FIG. 3A is a plot on pressure-temperature plane of the Clausius-Clapeyron locus, (C-C)

An actual liquid ammonia fuel system (1) was constructed according the FIGS. 1 and 3, operating in accordance with the fuel emulsion combustion model and used to fuel/power a 400 horsepower (hp) Waukesha diesel engine at 1800 rpm and 250 hp with 19% ammonia by mass. In this example ammonia was used, but the operation applies equally well to any highly volatile substance.

Consider the circuits in FIG. 1 to be modified by adding a pressure sensor at the entrance to the ammonia fuel pump, (13), and another pressure sensor at the exit from the heat exchanger, (44). The purpose of these pressure sensors is to propose a control system to sense and prevent the vaporization of ammonia.

Let us place a thermometer in the room or site where the fuel system is located. A thermodynamic table is set up relating the temperature to the saturation pressure of the ammonia, values for which are provided in a look-up table that is accessible by a controller (60). Whenever the pressure at the aforesaid stations, (13) and/or (44), approaches the vaporization pressure of the ammonia, the following actions may occur. Consider first the fluid line (1), (39) and (49). At the exit from the heat exchanger, (44), the pressure is increased by a valve to a value above the vapor pressure by activating the BPRV, (43). Several devices are already on the market to move an activating arm attached to the BPRV, (43). The motion of the arm is made proportional to the signal voltage, (read pressure difference between the ammonia saturation pressure and a preset pressure difference above the saturation pressure. This is determined automatically by the controller (60) and adjusted in cooperation with the look-up table values A similar procedure can be followed for the case when the local pressure at the ammonia pump entrance, (13), falls below the saturation pressure of ammonia. A signal can be generated and sent by controller (60) to the motor speed control means to slow down the motor rpm thus decreasing the negative suction pressure at the pump inlet. Alternately, an additional signal can be sent to open a solenoid valve, (90), to allow the ammonia pass through a sectional heat exchanger, (91), FIG. 4). If analysed on a C-C plot, it is seen that these coolers move the thermodynamic processes away from the vapor state. It is also seen that vapor lock can be thus prevented by either slowing down the motor rpm, or extending the heat transfer from the ammonia.

Controller, (60) is connected to each of the subsystems (10), (20), (30), (40), and (50), FIG. 1. By thereby monitoring the pressure and temperature of the ammonia, or indeed any of the volatile components of a mixture, cavitation and vapour lock can be prevented. Alternatively, the heat exchangers and pumps are preset so that during operating conditions, the maximum and minimum pressures and temperatures, and ranges allowed are such that evaporation of the liquid ammonic in lines (9), (39) and (49) does not occur.

Although examples of the present invention have been shown and described, it would be appreciated by those skilled in the art that changes may be made in these embodiments without departing from the principles and spirit of the invention, the scope of which is defined in the following claims and their equivalents.

What is claimed is:

1. A method of preparing a mixture of ammonia and fuel oil for use in an internal combustion engine, comprising steps:
   first providing a supply of ammonia at a predetermined pressure, temperature and flow rate to a metering-mixing module;
   second providing a supply of fuel oil at a predetermined pressure, temperature and flow rate to the metering-mixing module;
   mixing a predetermined ratio of the supplies of fuel oil and ammonia in the metering-mixing module; and
   supplying the predetermined ratio at a specified temperature and pressure into a fuel control loop for use by the internal combustion engine, the supplying including:
   a) using a jet pump, first channelling the predetermined ratio into an emulsifier sub-system to generate an emulsified fuel mixture flow;
   b) injecting a portion of the emulsified fuel mixture flow into a combustion chamber of the internal combustion engine to generate a disperse distribution of liquid fuel droplets therein to facilitate the formation of small combustion cells and thus produce efficient burning of both the ammonia and fuel oil components to provide a desired power;
   c) second channelling a remaining portion of the emulsified fuel mixture flow to cool the engine; and
   d) recirculating the remaining portion exiting the combustion engine head to the pump while regulating its temperature and pressure and combining it with the incoming predetermined ratio from the mixing-metering module in the step of first channelling.

2. The method as set forth in claim 1, further comprising a step of implementing a heat exchange process on the predetermined ratio prior to first channelling in the fuel control loop.

3. The method as set forth in claim 1, wherein the step of first providing the supply of ammonia at the predetermined temperature includes applying temperature control using at least one heat exchanger and wherein the step of second providing the supply of fuel oil at the predetermined temperature includes applying temperature control using at least one heat exchanger.

4. The method as set forth in claim 1, wherein, due to the generation of the emulsified fuel mixture flow in the step a), components of the fuel droplets in the disperse distribution generated in the step b) are characterized by different evaporative characteristics; wherein the different evaporative characteristics cause the fuel droplet components to evaporate and shatter, thereby facilitating the formation wherein one component is in a liquid state comprising a liquid kernel and the other component is in a gaseous state surrounding the liquid kernel to form a combustion cell.

5. The method as set forth in claim 4, wherein the formation of the combustion cell includes forming a combustion cell having a liquid kernel which functions as an ignition kernel.

6. The method as set forth in claim 4, wherein the formation of the combustion cell includes forming a combustion cell having a gaseous volume surrounding the liquid kernel which functions as an ignition source.

7. The method as set forth in claim 4, wherein the fuel droplet components with the different evaporative characteristics are formed with a solid particle at injection into the combustion chamber.

8. The method as set forth in claim 1, further comprising scaling the predetermined ratio of emulsified fuel for a large range of internal combustion engine sizes.

9. The method as set forth in claim 1, further comprising scaling the predetermined ratio of emulsified fuel for a large range of internal combustion engines sizes, wherein the large range includes internal combustion engines in sizes extending from 1 hp to 35000 HP.

10. The method as set forth in claim 1, wherein the step d) of recirculating the remaining portion exiting in the combustion engine head and combining it with the first channelled predetermined ratio includes facilitating the mixing of fluid components characterized by different pressures to insure smooth interacting flows that avoid or prevent slug flow.

11. The method as set forth in claim 1, further including a step of selecting of the liquid region of thermodynamic pressure-temperature space so that the temperate and pressure are maintained in cooperating ranges in order that the liquid ammonia component is not susceptible to vapor lock or cavitation.

12. The method as set forth in claim 1, wherein the step of injecting the portion of the emulsified fuel mixture flow into the combustion chamber of the internal combustion engine to generate the disperse distribution of liquid fuel droplets therein includes generating liquid fuel droplets characterized with different ignition characteristics, and wherein one of the fuel droplets ignites the remaining fuel droplets in the combustion cells distributed in the combustion chamber.

13. The method as set forth in claim 1, wherein the step of providing a supply of ammonia includes sensing a pressure of ammonia as it is pumped to the metering-mixing module, and based on the sensing, regulating the pumping to avoid vapour lock and cavitation.

14. The method as set forth in claim 1, wherein the step of first channelling includes sensing a pressure of the predetermined ratio as it is pumped from the metering-mixing module, and based on the sensing, regulating the pumping to avoid vapour lock and cavitation.

15. The method as set forth in claim 14, wherein the regulating includes utilizing controller and a look-up table, the look-up table comprising saturation pressure verses temperature values for the ammonia and fuel oil components, and controlling the respective temperatures and pressures based thereon; wherein the step of providing further includes using an ammonia pump motor that generates pumping power as a function of motor RPM, and controlling motor RPM as a function of a pressure difference between the local pressure and a vapor pressure of ammonia being pumped.

16. The method as set forth in claim 14, wherein the steps of first channelling and second channelling includes cooling the predetermined ratio and remaining portions respectively in a bypass controllable by the controller as function of detected pressure and temperature.

17. A fuel system for mixing a renewable fuel that is normally slow burning at a high temperature with a fuel oil, emulsifying the mixture and supplying the emulsified mixture to a combustion engine while avoiding vapour lock and cavitation, comprising:
- an ammonia supply system for holding ammonia at its vapor pressure in order to supply the ammonia in its liquid state, the ammonia system comprising a fluid conduit connected to a heat exchanger;
- a fuel oil supply system comprising a fuel oil reservoir, a fuel oil pump and a fuel oil pressure control device;
- a metering-mixing system in fluid communication with the ammonia and fuel oil supply systems, to mix the ammonia and fuel oil in a predetermined ratio, the metering mixing system comprising a heat exchange means and pressure control means to maintain the predetermined ratio at a temperature and pressure that avoids cavitation and vapour lock; and
- a fuel emulsifier loop comprising a pump, a fuel mixture pump, a heat exchanger and a fuel emulsifier interconnected to enable a flow to a combustion engine, wherein the pump channels the predetermined ratio into the fuel mixture pump and emulsifier sub-system to generate an emulsified fuel mixture flow, and one portion of the emulsified fuel mixture flow is injected into a combustion chamber as a disperse distribution of liquid fuel droplets, a remaining portion of the emulsified fuel mixture flow through a combustion engine head to cool the engine and the remaining portion exiting the combustion engine head is recirculated to the pump and combined with the incoming predetermined ratio from the mixing-metering module.

18. The fuel system as set forth in claim 17, further comprising a second heat exchanger to prevent cavitation in the fuel control loop.

19. The fuel system as set forth in claim 17, further comprising pressure and temperature detection and control means for determining a relationship between pressure of the ammonia and temperature, and controlling the pressure of the ammonia in the fuel system according to the determined temperature-pressure relationship.

20. The fuel system as set forth in claim 17, wherein the heat exchangers are connected to a refrigeration system.

21. The fuel system as set forth in claim 17, wherein the fuel control loop includes a heat exchanger forming a bypass together with a three way solenoid valve to open and shut off the flow of ammonia and refrigerant in that bypass section.

22. The fuel system as set forth in claim 21, wherein the fuel control loop further includes a pressure sensor and motive devices to control a local pressure based on detected ammonia saturation pressure determined as a function of temperature.

23. The fuel system as set forth in claim 22, wherein a pressure sensor disposed at the entrance of the fuel emulsifier loop detects if pressure falls below the saturation pressure of the ammonia, and if pressure falls below the saturation pressure of the ammonia, a controller responds by slowing a motor driving the fuel mixture pump, while operating the heat exchanger to lower the ammonia temperature.

24. A motor vehicle including a combustion engine comprising a fuel system as set forth in claim 17, wherein the engine propels the motor vehicle.

25. A motor vehicle including a combustion engine in which its fuel system is replaced with a fuel system as set forth in claim 17.

26. A method of preparing a mixture of ammonia and fuel oil for use in a boiler, comprising steps:
- first providing a supply of ammonia at a predetermined pressure, temperature and flow rate to a metering-mixing module;
- second providing a supply of fuel oil at a predetermined pressure, temperature and flow rate to the metering-mixing module;
- mixing a predetermined ratio of the supplies of fuel oil and ammonia in the metering-mixing module; and
- supplying the predetermined ratio at a specified temperature and pressure into a fuel control loop for use by the boiler, the supplying including:
  a) using a pump, first channelling the predetermined ratio into an emulsifier sub-system to generate an emulsified fuel mixture flow;
  b) injecting a portion of the emulsified fuel mixture flow into a combustion chamber of the boiler to generate a disperse distribution of liquid fuel droplets therein to facilitate the formation of small combustion cells and thus produce efficient burning of both the ammonia and fuel oil components to provide a desired power;
  c) second channelling a remaining portion of the emulsified fuel mixture flow to cool the boiler; and
  d) recirculating the remaining portion to the pump while regulating its temperature and pressure and combining it with the incoming predetermined ratio from the mixing-metering module in the step of first channelling.

\* \* \* \* \*

UNITED STATES PATENT AND TRADEMARK OFFICE
CERTIFICATE OF CORRECTION

PATENT NO.        : 8,495,974 B2  
APPLICATION NO.   : 12/454443  
DATED             : July 30, 2013  
INVENTOR(S)       : Vito Agosta It is certified that error appears in the above-identified patent and that said Letters Patent is hereby corrected as shown below:

On the Title Page, Item (73):

Assignee should read: FAST Systems Corporation, E. Northport, NY

Signed and Sealed this  
Twenty-second Day of October, 2013

Teresa Stanek Rea  
*Deputy Director of the United States Patent and Trademark Office*